(12) United States Patent  (10) Patent No.: US 8,719,512 B2
Sugizaki  (45) Date of Patent: May 6, 2014

(54) SYSTEM CONTROLLER, INFORMATION PROCESSING SYSTEM, AND ACCESS PROCESSING METHOD

(75) Inventor: Go Sugizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 12/732,643

(22) Filed: Mar. 26, 2010

(65) Prior Publication Data
US 2010/0250862 A1  Sep. 30, 2010

(30) Foreign Application Priority Data

Mar. 31, 2009  (JP) .................................. 2009-88380

(51) Int. Cl.
*G06F 12/14* (2006.01)
*G06F 12/08* (2006.01)
*G06F 17/30* (2006.01)

(52) U.S. Cl.
CPC ........ *G06F 12/0831* (2013.01); *G06F 12/0817* (2013.01); *G06F 17/30362* (2013.01)
USPC ............ 711/146; 711/141; 711/144; 711/145

(58) Field of Classification Search
CPC ............ G06F 12/0831; G06F 12/0817; G06F 17/30362
USPC .................. 711/141, 144, 145, 146
See application file for complete search history.

(56) References Cited

U.S. PATENT DOCUMENTS

| | | | |
|---|---|---|---|
| 5,862,357 A * | 1/1999 | Hagersten et al. | 710/305 |
| 5,890,217 A * | 3/1999 | Kabemoto et al. | 711/141 |
| 6,011,791 A * | 1/2000 | Okada et al. | 370/352 |
| 6,101,569 A | 8/2000 | Miyamoto et al. | |
| 6,516,391 B1 * | 2/2003 | Tsushima et al. | 711/146 |

(Continued)

FOREIGN PATENT DOCUMENTS

| | | |
|---|---|---|
| JP | 58-107977 | 6/1983 |
| JP | 04-271450 | 9/1992 |

(Continued)

OTHER PUBLICATIONS

McCurdy, Collin, and Charles Fischer. "User-controllable coherence for high performance shared memory multiprocessors." ACM SIGPLAN Notices. vol. 38. No. 10. ACM, 2003.*

(Continued)

*Primary Examiner* — Tuan Thai
*Assistant Examiner* — Samuel Dillon
(74) *Attorney, Agent, or Firm* — Staas & Halsey LLP

(57) ABSTRACT

A system controller includes an output unit which transfers an access request from an access source coupled to the system controller to an other system controller; a local snoop control unit that determines whether a destination of the access request from the access source is a local memory unit coupled to the system controller, and locks the destination when the destination is the local memory unit; a receiving unit which receives the access request from the output unit and an access request from an other system controller; a global snoop control unit which sends a response indicating whether the access request is executable or not, and controls locking of the destination of the access request when the destination is the local memory unit; and an access processing unit which unlocks the locking and accesses the memory unit when the access request from the access source becomes executable.

8 Claims, 12 Drawing Sheets

(56) References Cited

U.S. PATENT DOCUMENTS

| | | | |
|---|---|---|---|
| 6,519,665 B1* | 2/2003 | Arimilli et al. | 710/110 |
| 6,647,463 B2* | 11/2003 | Yamashiroya | 711/118 |
| 6,829,698 B2* | 12/2004 | Arimilli et al. | 712/208 |
| 6,842,847 B2* | 1/2005 | Arimilli et al. | 712/208 |
| 6,915,396 B2* | 7/2005 | Wiens et al. | 711/158 |
| 6,922,744 B1* | 7/2005 | Sipple et al. | 710/200 |
| 7,213,248 B2* | 5/2007 | Arimilli et al. | 718/104 |
| 7,584,330 B2* | 9/2009 | McKinney et al. | 711/146 |
| 8,225,120 B2* | 7/2012 | Arimilli et al. | 713/323 |
| 2006/0047918 A1 | 3/2006 | Sugizaki | |
| 2006/0090041 A1* | 4/2006 | Nakagawa | 711/146 |
| 2008/0244134 A1 | 10/2008 | Hosomi et al. | |

FOREIGN PATENT DOCUMENTS

| | | |
|---|---|---|
| JP | 7-21077 | 1/1995 |
| JP | 11-39209 | 2/1999 |
| JP | 2006-72509 | 3/2006 |
| WO | WO 2006/004196 | 1/2006 |

OTHER PUBLICATIONS

Rajwar, Ravi, and James R. Goodman. "Transactional lock-free execution of lock-based programs." ACM SIGOPS Operating Systems Review. vol. 36. No. 5. ACM, 2002.*

* cited by examiner

FIG. 11

| CPU REQUEST | CACHE | TARGET MEMORY | WHETHER OR NOT RESOLVABLE WITH LOCAL — CONVENTIONAL METHOD | WHETHER OR NOT RESOLVABLE WITH LOCAL — PRESENT METHOD |
|---|---|---|---|---|
| MI-IF/SH (SHARED-TYPE FETCH) | MISS | LOCAL | × | ○ |
| | MISS | REMOTE | × | × |
| | SH-HIT | - | ○ | ○ |
| | EX-HIT | - | ○ | ○ |
| MI-EX (EXCLUSIVE TYPE FETCH) | MISS | LOCAL | × | ○ |
| | MISS | REMOTE | × | × |
| | SH-HIT | - | × | ○ |
| | SELF SH-HIT | - | × | ○ |
| | EX-HIT | - | ○ | ○ |

○: ENABLE
×: DISABLE

SYSTEM CONTROLLER, INFORMATION PROCESSING SYSTEM, AND ACCESS PROCESSING METHOD

CROSS-REFERENCE TO RELATED APPLICATIONS

This application is based upon and claims the benefit of priority of the prior Japanese Patent Application No. 2009-88380, filed on Mar. 31, 2009, the entire contents of which are incorporated herein by reference.

FIELD

Embodiment discussed herein relates to a system controller to which a memory unit and/or an access source unit is coupled, and an information processing system that includes a system controller.

BACKGROUND

Conventionally, a system in which a plurality of units (devices) access a memory unit has been employed. An arithmetic unit, such as a central processing unit (CPU) or the like, and an input/output unit generally called an "Input/Output" (IO) are some examples of access source units that access the memory unit.

A system controller is provided between the memory unit and the access source unit. The system controller locks a storing destination address in the memory unit in which a store access has occurred to perform exclusive control, so that data consistency may be maintained even in a case where there is a plurality of access source units. Furthermore, the system controller checks to see if there is cache data about a destination address of an access request, so that data coherency may be maintained, in a case where the access source unit, such as the CPU, having a cache, is coupled to the system controller.

Moreover, an information processing system has also been employed in which the memory unit and the access source unit are coupled to the system controller to form a system board and the plurality of such system boards are coupled with each other. As to the information processing system that includes the plurality of system boards, the system controller provided on each of the system boards communicates with each other to transfer access requests, so that each access source unit may access the memory unit within the same system board or may access the memory unit on the other system board.

To maintain the data consistency in the store accesses between the system boards, each of the system controllers reports on access generation status and/or cache status within the same system board with each other and performs a global snoop by which determination of status of accesses in an entire system is made.

When it is determined, based on the global snoop, that a memory unit may be in an accessible state, the system controller provided on the system board on which an access request has been generated locks a destination address of included in the access request and executes access processing.

In addition, as to the data cached by the CPU within the same system board, it is quite certain that neither a cache nor an access has been generated on the other system board. In consequence, a local snoop is performed by which determination is made whether or not the destination address of the access request generated in a system board is cached within the same system board. When it is determined, based on the local snoop, that the destination address is being cached within the same system board, the system controller accesses the memory unit without waiting for a determination result by the global snoop, so that faster processing may be achieved.

[Patent Document]
Japanese Laid-Open Patent Application No. Hei7-21077
[Patent Document]
Japanese Laid-Open Patent Application No. Sho58-107977
[Patent Document]
Japanese Laid-Open Patent Application No. Hei4-271450
[Patent Document]
Japanese Laid-Open Patent Application No. 2006-72509

In the configuration in which the plurality of system boards is coupled with each other, it has been typical that each system board includes a CPU thereon to improve its processing capability. However, thanks to the improved processing capability of CPUs in recent years, the other configuration is employed in which the CPUs are brought together on one system board and only input/output units (IOs) are provided, as the access source unit, on the other system boards.

In the configuration in which the CPUs are provided on two or more system boards, processing with the local snoop is possible by each system board when the CPU within the same system board gets a cache hit. However, there is a possibility that data is cached by the CPU on the other system board, in a cache miss within the same system board. Under such circumstances, for this reason, processing with the global snoop is performed in the cache miss within the same system board.

In the configuration where the CPUs are brought together on one system board, it is unnecessary to take the possibility into consideration that the data is being cached on the other board. However, in the above case, when a store access is made from the other board to the memory unit within the same system board, address locking is made at the system board that is a source of access. In consequence, the global snoop is performed to check the status of accesses to the memory unit within the same system board.

SUMMARY

A system controller includes an output unit which transfers an access request from an access source coupled to the system controller to an other system controller; a local snoop control unit that determines whether a destination of the access request from the access source is a local memory unit coupled to the system controller, and locks the destination when the destination is the local memory unit; a receiving unit which receives the access request from the output unit and an access request from an other system controller; a global snoop control unit which sends a response indicating whether the access request is executable or not, and controls locking of the destination of the access request when the destination is the local memory unit; and an access processing unit which unlocks the locking and accesses the memory unit when the access request from the access source becomes executable.

The above-described embodiments of the present invention are intended as examples, and all embodiments of the present invention are not limited to including the features described above.

BRIEF DESCRIPTION OF DRAWINGS

FIG. 11 illustrates a table explaining an increase in cases that is resolvable within a local.

DESCRIPTION OF EMBODIMENTS

Hereinafter, an embodiment of a system controller, an information processing system, and an access processing method will be disclosed with reference to drawings. Note that the present invention will not be limited to the disclosed embodiment.

Figure 1:
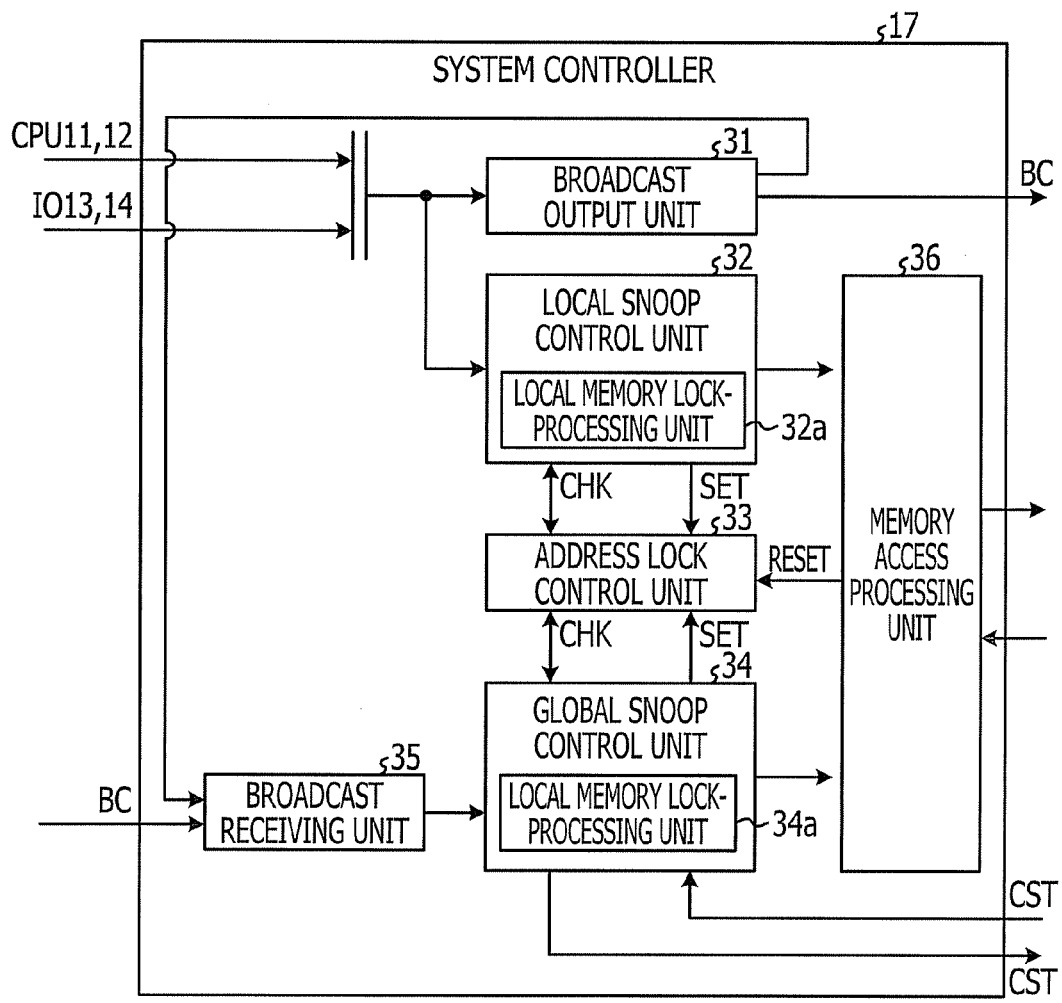
FIG. 1 illustrates a configuration of a system controller according to an embodiment.
Figure 2:
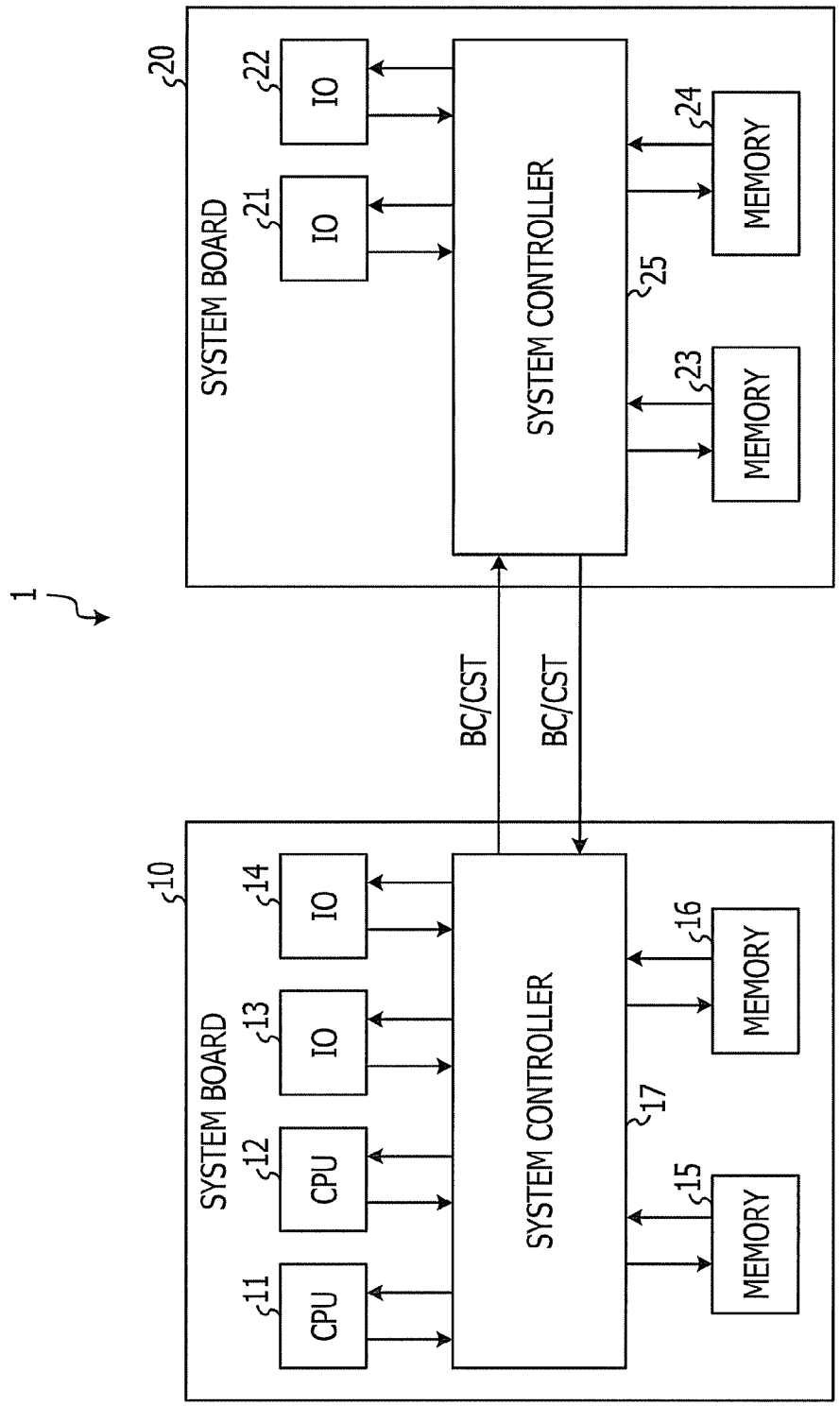
FIG. 2 illustrates a configuration of an information processing system according to the embodiment.

FIG. 1 illustrates a block diagram indicating a configuration of a system controller according to an embodiment. FIG. 2 illustrates a block diagram indicating a configuration of an information processing system that includes the system controllers illustrated in FIG. 1.

The information processing system 1 illustrated in FIG. 2 includes a plurality of system boards, that is, a system board 10 and a system board 20. The system board 10 is provided with a system controller 17 that is a system control unit and is coupled to a plurality of CPUs 11 and 12, a plurality of IOs 13 and 14, and a plurality of memories 15 and 16. The system board 20 is provided with a system controller 25 that is the system control unit and is coupled to a plurality of IOs 21 and 22, and a plurality of memories 23 and 24. Note that the number of system boards is not limited to two (2).

The memories 15, 16, 23, and 24 are a memory unit. Both CPUs 11 and 12 are an arithmetic unit and function as an access source unit that includes a cache memory. The IOs 13, 14, 21, and 22 are an input/output unit and function as an access source unit without including the cache memory.

The system controller 17 and the system controller 25 communicate with each other. The system controller 17 broadcasts (indicated as "BC" in the drawings) access requests from the access source units within the system board 10, that is, any of the CPUs 11 and 12 and the IOs 13 and 14, to the system controller 25. The system controller 25 returns responses (indicated as "CST" in the drawings) to the access requests broadcasted from the system controller 17 back to the system controller 17. In the same manner, the system controller 25 broadcasts (BC) access requests from the access source units, that is, any of the IOs 21 and 22 within the system board 20, to the system controller 17. The system controller 17 returns responses (CST) to the access requests broadcasted from the system controller 25 back to the system controller 25.

As illustrated in FIG. 1, the system controller 17 includes a broadcast output unit 31, a local snoop control unit 32, an address lock control unit 33, a global snoop control unit 34, a broadcast receiving unit 35, and a memory access processing unit 36, therein.

Upon receiving an access request from any of the CPUs 11 and 12 and the IOs 13 and 14, each of which is the access source unit directly coupled to the system controller 17, the system controller 17 inputs the received access request to the broadcast output unit 31 and the local snoop control unit 32.

The broadcast output unit 31 broadcasts to send the input access request to the other system board 20, and the broadcast output unit 31 inputs the access request to the broadcast receiving unit 35 within the system controller 17.

The local snoop control unit 32 makes a determination of whether or not a destination address of the input access request, that is, the access request generated in a system board, is being cached within the same system board. Since the CPUs 11 and 12 in the system board 10 are the access source units having the cache memory therein, the local snoop control unit 32 makes a determination of whether or not the destination address of the input access request is being cached by the CPU 11 or the CPU 12.

When the destination address of the access request generated in a system board, that is, the input access request, is being cached within the same system board, in other words, in a so-called cache hit case, it is certain that data about the destination address of the access request is not cached on the other system board or is not locked by an access from the other system board. In consequence, when the access request is a store access request, the local snoop control unit 32 causes the address lock control unit 33 to lock the destination address of the access request and causes the memory access processing unit 36 to process the store access request.

The local snoop control unit 32 includes a local memory lock-processing unit 32a therein. When the destination address of the access request generated in a system board is not cached within the same system board, in other words, in a so-called cache miss case, the local memory lock-processing unit 32a makes a determination of whether or not the destination of the access request is either the memory 15 or the memory 16.

When a destination of the store access request is either the memory 15 or the memory 16, in other words, when the destination of the store access request is a local memory that is a memory unit coupled to the system controller within the same system board, the local memory lock-processing unit 32a causes the address lock control unit 33 to lock the destination address of the store access request and causes the memory access processing unit 36 to process the store access request.

The broadcast receiving unit 35 receives the broadcasted access request BC to send to the global snoop control unit 34. The broadcast receiving unit 35 equally treats the access request broadcasted by the broadcast output unit 31 in the system board 10 that is the system board on which the broadcast output unit 31 is provided thereon and an access request broadcasted by the other system board, the system board 20 for example, on which the broadcast output unit 31 is not provided thereon.

When an access request input through the broadcast receiving unit 35, that is, a destination of the broadcasted access request is a local memory unit, in other words, the memory 15 or the memory 16 coupled to the system controller 17, the global snoop control unit 34 sends a response indicating whether the access request is executable or not and controls locking of the corresponding destination.

More specifically, the global snoop control unit 34 searches the address lock control unit 33 by using the destination address of the access request, as a key (see FIG. 1 CHK). As a result of the search performed by the address lock control unit 33, when the destination address of the access request is being locked, in other words, when the destination address has been registered on the address lock control unit 33, the global snoop control unit 34 sends a determination result indicating that the store access processing is unexecutable, to the system controller that is a source of the access request, as a response CST.

On the other hand, when the destination address of the access request is being unlocked, in other words, when the destination address is not being registered on the address lock control unit 33, the local memory lock-processing unit 34a in the global snoop control unit 34 makes a determination of whether the destination of the access request is the local memory unit or not.

When the destination of the access request is not the local memory unit, that is, the destination is not the memory 15 or the memory 16, the local memory lock-processing unit 34a sends a determination result indicating that access processing is executable, to the system controller that is the source of the access request as the response CST.

On the other hand, when the destination of the access request is the local memory unit, that is, the destination is the memory 15 or the memory 16, the local memory lock-processing unit 34a relates the access request and locking identification information, attaches the locking identification information to a determination result indicating that the access processing is executable, and sends the a determination result to the system controller that is the source of the access request. The locking identification information is a piece of information that is attached in a manner that corresponds to the destination address. Any destination address is capable of being uniquely identified by this locking identification information. As the locking identification information, for example, an ID for a lock register used for locking the destination address may be used.

The meaning of "access processing is executable" in the response CST sent by the global snoop control unit 34 is a determination result made locally and indicating that locking is not being made in the address lock control unit 33. The global snoop control unit 34, per se, searches the address lock control unit 33 to send a search result as the response CST.

In the same manner, the system controller 25 provided on the system board 20 searches an address lock control unit provided therein to send a search result as the response CST.

The global snoop control unit 34 in the system board 10 globally makes a determination of whether or not the access request is executable in an entire information processing system 1 by using the search result the global snoop control unit 34 made and the response received from the system controller 25. In the same manner, the system controller 25 globally makes a determination in the same (or similar) timing as that of the system controller 17 by using the search result the system controller 25 made and the response received from the system controller 17. Since each of the system controllers 17 and 25 globally makes the determination based on the same information, determination results made globally by each of the system controllers 17 and 25 coincide with each other.

When an access request is executable as the determination results made globally and an issuing source of the access request is a local access source unit, that is, any of the CPUs 11 and 12, and the IOs 13 and 14, the global snoop control unit 34 causes the memory access processing unit 36 to perform the access processing. In addition, when an access request is executable and a destination of its store access request is the local memory unit, that is, either of the memory 15 or the memory 16, the local memory lock-processing unit 34a registers (indicated as "SET" in the drawing) the destination address of the store access request on the address lock control unit 33 to cause the address lock control unit 33 to lock the destination address.

When the memory access processing unit 36 receives an instruction from the local snoop control unit 32 or the global snoop control unit 34, the memory access processing unit 36 processes the access request. The memory access processing unit 36 directly processes the store access request when the destination of the store access request is the local memory unit, that is, the memory 15 or the memory 16. Thereafter, the memory access processing unit 36 performs an access response to the access source unit and causes the address lock control unit 33 to reset locking of the accessed destination address.

On the other hand, when the destination of the access request is not the local memory unit, that is, the memory 23 or the memory 24 provided on the system board 20, the memory access processing unit 36 transfers the access request to a memory access processing unit in the system controller 25. Then, the memory access processing unit 36 receives a processing result of the access request from the system controller 25 and performs an access response to the access source unit.

In addition, when the memory access processing unit 36 receives a store access request intended for the memory 15 or the memory 16 and transferred from the memory access processing unit in the system controller 25, the memory access processing unit 36 directly processes the transferred store access request. Thereafter, the memory access processing unit 36 sends a processing result to the system controller 25 and causes the address lock control unit 33 to reset locking of the accessed destination address.

In this way, when the destination of the store access request is the local memory unit, that is, the memory 15 or the memory 16, the local snoop control unit 32 and the global snoop control unit 34 register the destination address on the address lock control unit 33. Then, the memory access processing unit 36 deletes the address registered on the address lock control unit 33 to reset upon termination of the store access processing performed on the memory 15 or the memory 16. Thus, the address lock control unit 33 controls the status of accesses to the local memory unit. For this reason, the information processing system 1 is configured to perform control over the locking at a system board that is the access destination.

Figure 3:
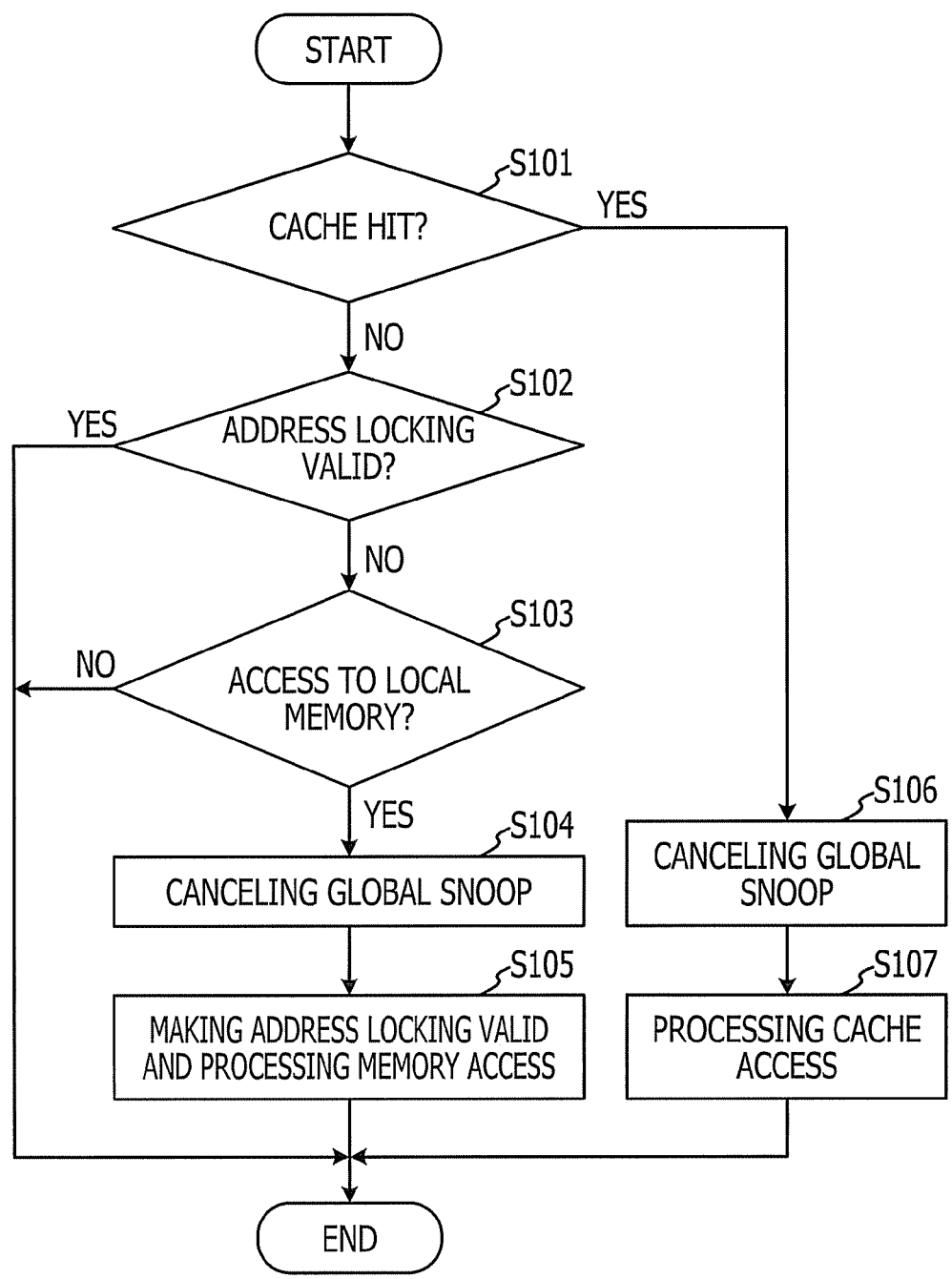
FIG. 3 illustrates a flowchart explaining processing operations with a local snoop.

FIG. 3 illustrates a flowchart explaining processing operations with a local snoop. Upon receipt of an access request generated in the local access source unit, the local snoop control unit 32 makes a determination of whether or not data about a destination address of the access request is being cached by the CPU 10 or the CPU 11 provided on the system board 10 (Operation S101). The system controller 17 holds a table about an address portion of the data cached by the CPU 11 or the CPU 12. The local snoop control unit 32 searches the table by using the destination address as a key, and makes the determination of whether or not a piece of data corresponding to the destination address is being cached by the CPU 10 or the CPU 11.

When a destination address of the access request is being cached by the CPU 10 or the CPU 11, in other words, in the cache hit case (Operation S101 Yes), the local snoop control unit 32 cancels the global snoop (Operation S106), process the access request to the cache that holds the data (Operation S107), and terminates the local snoop.

On the other hand, when the destination address of the access request is being cached neither by the CPU 10 nor the CPU 11, in other words, in the cache miss case (Operation S101 No), the local memory lock-processing unit 32a searches the address lock control unit 33 by using the destination address as a key and makes a determination of whether or not locking of the destination address is valid (Operation S102). As a result of the determination, when the destination address is being locked (Operation S102 Yes), the system controller 17 terminates its processing.

On the other hand, when the locking of the destination address is invalid (Operation S102 No), the local memory lock-processing unit 32a makes a determination of whether or not the destination address is the local memory, that is, the memory 15 or the memory 16 (Operation S103). As a result of the determination, when the destination address does not fall under the local memory, in other words, when the destination address is not the access request to the local memory (Operation S103 No), the local snoop control unit 32 terminates its processing.

On the other hand, when the destination address is the local memory (Operation S103 Yes), the local memory lock-processing unit 32a cancels the global snoop (Operation S104), registers the destination address of the store access request on the address lock control unit 33, and makes the address lock of the destination address valid. Then, the local memory lock-processing unit 32a causes the memory access processing unit 36 to perform processing on the store access request (Operation S105) and terminates the local snoop.

Figure 4:
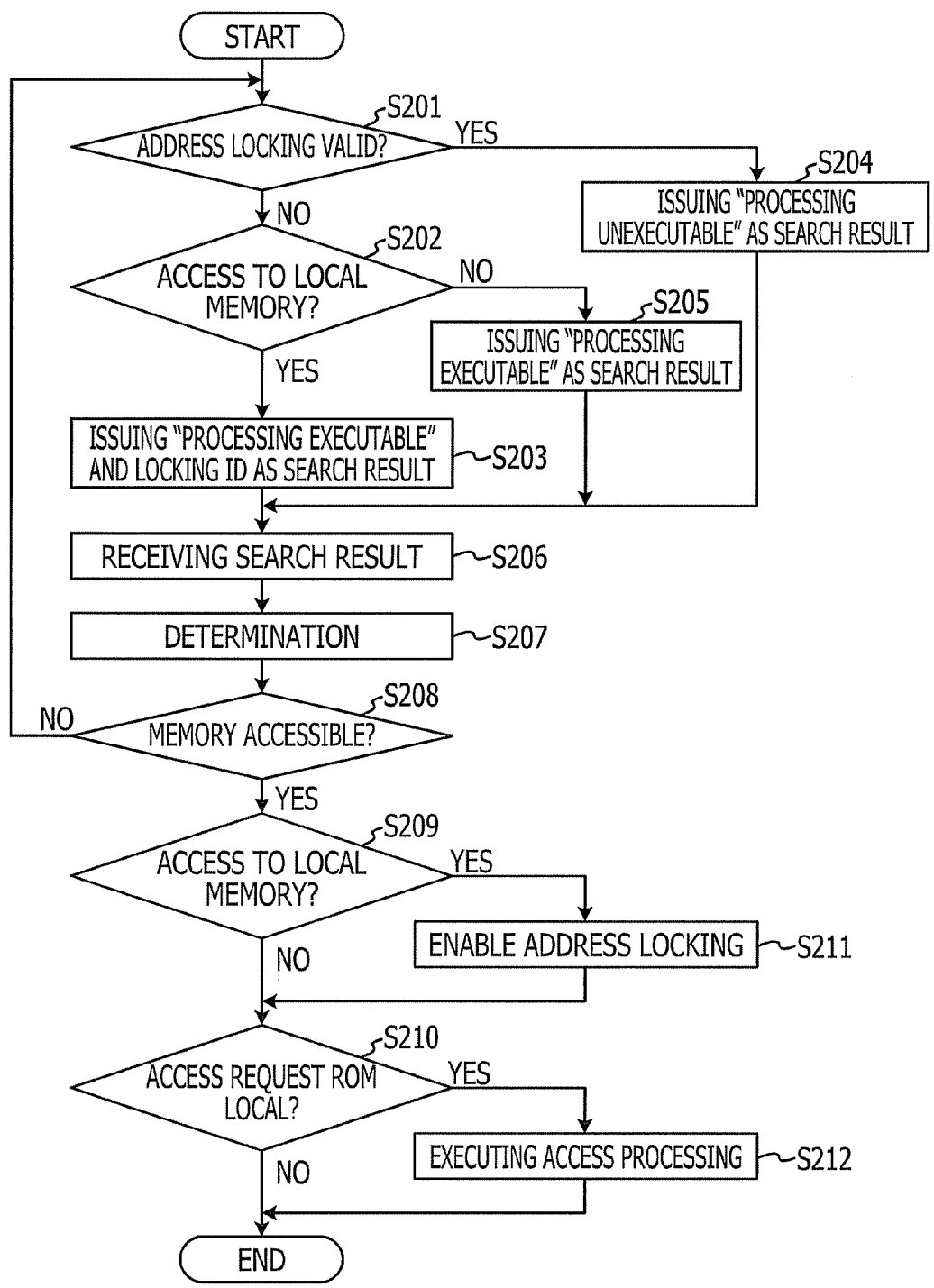
FIG. 4 illustrates a flowchart explaining processing operations with a global snoop.

FIG. 4 illustrates a flowchart explaining processing operations with the global snoop. Upon receipt of an access request from the broadcast receiving unit 35, the global snoop control unit 34 searches the address lock control unit 33 by using the destination address of the access request as a key and makes a determination of whether or not locking of the destination address is valid (Operation S201). As a result of the determination, when the destination address is being locked (Operation S201 Yes), the global snoop control unit 34 sends a determination result "processing unexecutable" indicating that access processing is unexecutable, as the response CST, to the access source (Operation S204).

When the locking of the destination address is invalid (Operation S201 No), the local memory lock-processing unit 34a makes a determination of whether or not the access request is the one intended for the local memory, in other words, whether or not the destination address is the local memory (Operation S202). As a result of the determination, when the access request is not the one intended for the local memory (Operation S202 No), the global snoop control unit 34 sends a determination result "processing executable" indicating that the access processing is executable, as the response CST, to the access source (Operation S205).

On the other hand, when the access request is the one intended for the local memory, in other words, when the destination address is the local memory (operation S202 Yes), the local memory lock-processing unit 34a relates the locking identification information (locking ID) to the access request. The global snoop control unit 34 sends the determination result, indicating that the access processing is executable, to the access source (Operation S203). Note here that the locking identification information is attached to the determination result before the determination result is sent to the access source.

The global snoop control unit 34 receives a search result in the other system board, that is to say, a determination result made locally on the other system board, from the other system board (Operation S206) after sending the determination result the global snoop control unit 34 made locally, to the access source, the global snoop control unit 34 globally makes a determination of whether or not the access request is capable of being processed in the entire information processing system 1 (Operation S207).

As a result of the determination made globally, when the access request is unexecutable (Operation S208 No), the global snoop control unit 34 returns again to Operation S201. On the other hand, when a state in which the access request is executable is achieved (Operation S208 Yes), the local memory lock-processing unit 34a makes a determination of whether or not the access request is the one intended for the local memory, in other words, whether or not the destination address is the local memory (Operation S209). As a result of the determination, when the access request is the store access request to the local memory (Operation S209 Yes), the local memory lock-processing unit 34a registers the destination address of the access request on the address lock control unit 33 and makes the address lock valid (Operation S211).

After completion of the Operation S211 or when the access request is not the one intended for the local memory (Operation S209 No), the global snoop control unit 34a makes a determination of whether or not the issuing source of the access request is the local access source unit (Operation S210). When the access request is not the one issued from the local access source unit, the processing terminates (Operation S210 No). On the other hand, when the access request is the one issued from the local access source unit (Operation S210 Yes), the global snoop control unit 34a causes the memory access processing unit 36 to execute the processing of the access request (Operation S212) and terminates the global snoop.

Next, the processing operations for the access request in the information processing system 1 illustrated in FIG. 2 will be explained by comparing it with processing operations of another information processing system, as a comparative example, that is not according to the embodiment.

Figure 5:
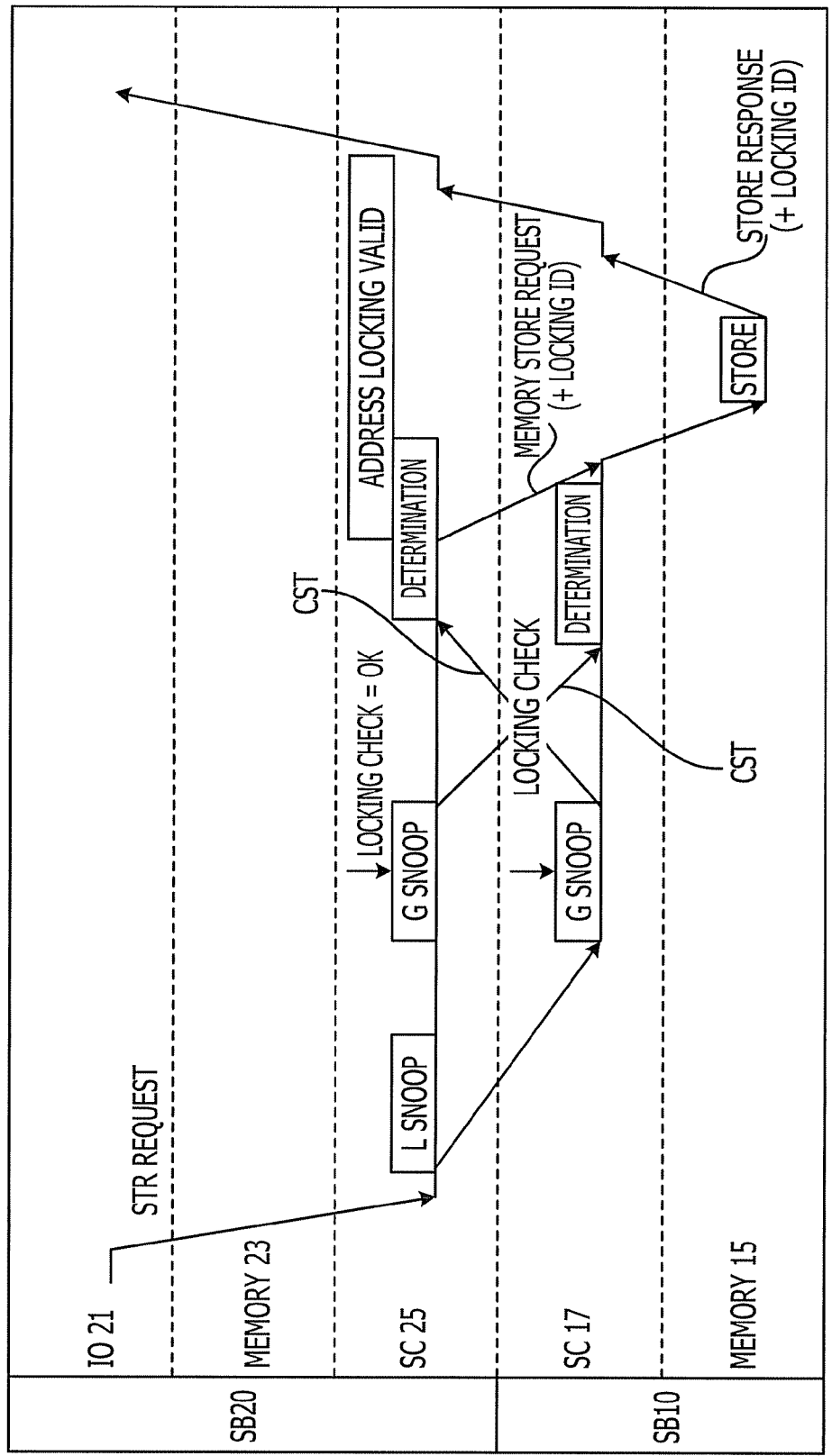
FIG. 5 illustrates a diagram explaining processing operations which are not according to the embodiment and are performed in a case where an IO issues a store request.

FIG. 5 illustrates a diagram explaining the processing operations by the comparative example in a case where an IO issues a store request. An IO 21 provided on a system board 20 issues a store request (indicated as "STR" in the drawings) to a memory 15 provided on a system board 10 through a system controller 25, in an information processing system 1 of the comparative example. After a local snoop (indicated as "L snoop" in the drawings) by the system controller 25, a global snoop (indicated as "G snoop" in the drawings) is performed by each of the system controller 25 and a system controller 17. In the global snoop, each of the system controller 17 and the system controller 25 checks to see if a destination of the store request is being locked or not and sends a check result (indicated as "CST" in the drawings) with each other. The example illustrated in FIG. 5 depicts a case where determination is made in which a "locking check" is "OK", that is, a destination address is not being locked.

Each of the system controllers 17 and 25 makes a determination of a state of locking by using a check result performed by one of the system controllers and a check result received from the other system controller. When the both check results, that is, the check result performed by one of the system controllers and the other check result received from the other system controller are "lock OK", in other words, when the check results indicate that the destination address of the store request is not being locked, each of the system controllers 17 and 25 makes a determination that a memory store request is executable.

Then, the system controller 25 on the system board 20 that is an issuing source of the store request registers the destination address on an address lock control unit and makes the address lock valid. The system controller 25 sends an ID of a registered lock register, as a "locking ID", to the system board 10 that is an access destination, along with the memory store request.

Upon receipt of the memory store request, the system controller 17 provided on the system board 10 performs store processing onto the memory 15, and the system controller 17 returns a store response to the system board 20. In addition, the system controller 17 returns the locking ID received from the system controller 25 along with the store request, to the system controller 25 along with the store response.

The system controller 25 that have received the store response and the locking ID from the system controller 17 unlocks the address lock of the destination address based on the received locking ID and sends the store response to the IO 21.

In the above processing operations executed by the comparative example, control over the address lock is made by the system board 20 that is the issuing source of the store request. On the other hand, as disclosed above, the system controller to which the memory unit that is a request destination of the store request is coupled, (in other words, the system controller to which a target memory is coupled) controls the address lock, in the present embodiment.

Figure 6:
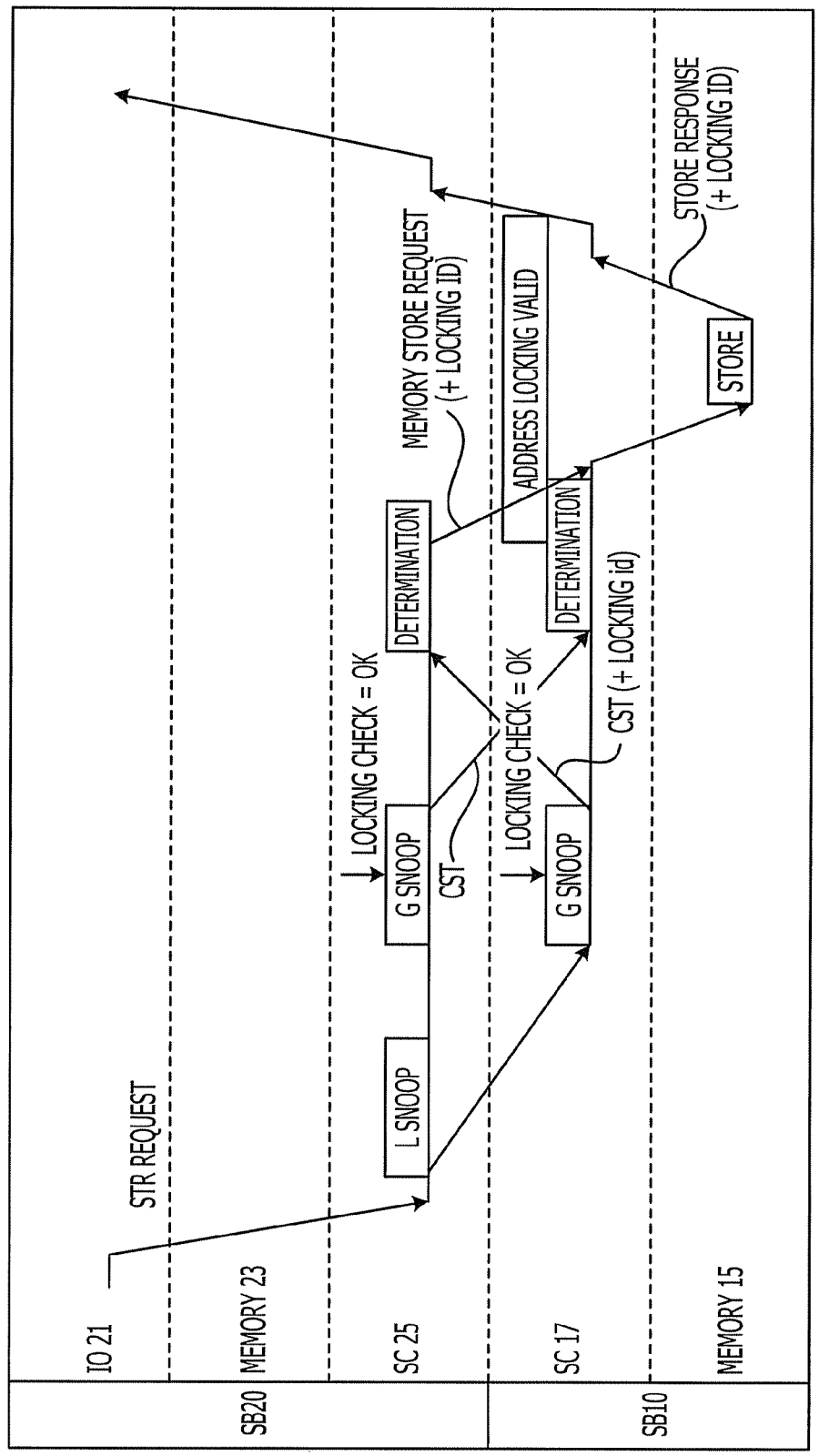
FIG. 6 illustrates a diagram explaining processing operations which are according to the embodiment and in which address locking is controlled at a request destination.

FIG. 6 illustrates a diagram explaining processing operations of the present embodiment that controls the address lock at the request destination, that is, at the system controller 17 provided on the system board 10. In the example illustrated in FIG. 6, the IO 21 issues a store request (STR) in the same manner as the comparative example illustrated in FIG. 5. In response to the store request from the IO 21, the global snoop (G snoop) is performed by the system controller 17 and the system controller 25, after the local snoop (L snoop) performed by the system controller 25. With the global snoop, each of the system controllers 17 and 25 checks to see if the destination of the store request is being locked or not and sends a check result CST with each other.

In addition, the system controller 17 on the system board 10 that is a request destination of the store request determines an ID of the lock register used for the locking based on the store request when the locking check is "OK." Then, the system controller 17 sends the determined locking ID to the system controller 25 along with the check result CST.

Each of the system controllers 17 and 25 makes a determination by using an own check result and the other check result received from the other system controller, respectively. When the both check results, that is, both of the check result performed by one of the system controllers and the other check result received from the other system controller are the "lock OK", in other words, when the check results indicates that the destination address of the store request is not being locked, each of the system controllers 17 and 25 makes a determination that a memory store request is executable.

In addition, the system controller 25 on the system board 20 that is the issuing source of the store request sends the memory store request to the system board 10 along with the locking ID received from the system controller 17. Moreover, the system controller 17 on the system board 10 that is the request destination of the store request registers the destination address of the store request received from the system controller 25 on the address lock control unit and makes the address lock of the destination address valid.

Upon receiving the memory store request from the system controller 25, the system controller 17 on the system board 10 performs the store processing onto the memory 15, and the system controller 17 returns a store response to the system board 20. Furthermore, corresponding to the store response, the system controller 17 unlocks the address lock of the destination address based on the locking ID received from the system controller 25 along with the store request. Then, the system controller 25 having received the store response from the system controller 17 sends the store response to the IO 21.

The control over the address lock is made at the system board 10 that is the request destination of the store request, in this processing operation. Moreover, in performing the global snoop, the system board 10 that is the request destination of the store request reports the locking ID, along with the result of the locking check, to the system board 25 that is a request source of the store request.

It is necessary to relate the store request to the store response when the destination address of the store request is locked and the locking is unlocked at the time of the store response. If a packet for the store response includes the address itself, this allows a correspondence-relation with the store request to be checked. In consequence, it is possible to identify which address lock is to be unlocked. However, if the packet for the store response includes the address itself, this causes an increase in packet size of the store response by the amount of included address. To reduce the packet size of the store response, the locking ID is attached to the destination address in locking the address to include the locking ID in the store response. The above configuration allows a reduction in packet size of the store response.

In the example illustrated in FIG. 5, the system controller 25 performs the address locking and sends the store request with the locking ID attached thereto, to the system controller 17. The system controller 17 performs the store processing and attaches the locking ID to the store response, thereafter the system controller 17 returns the store response with the locking ID attached thereto to the system controller 25. The system controller 25 unlocks the address lock corresponding to the locking ID indicated by the store response.

In the example illustrated in FIG. 6, the system controller 17 performs the address locking. Consequently, the system controller 17 relates the locking ID to the destination address when responding a result of the global snoop, attaches the locking ID to the response CST of the global snoop, and sends the response CST to the system controller 25. The system controller 25 attaches the locking ID that has been attached to the response CST of the global snoop to the store request and sends the store request with the locking ID attached thereto to the system controller 17. The system controller 17 uses the locking ID attached to the store request for the address locking to execute the store request. After executing the store request, the system controller 17 unlocks the address lock corresponding to the locking ID attached to the store response.

Figure 7:
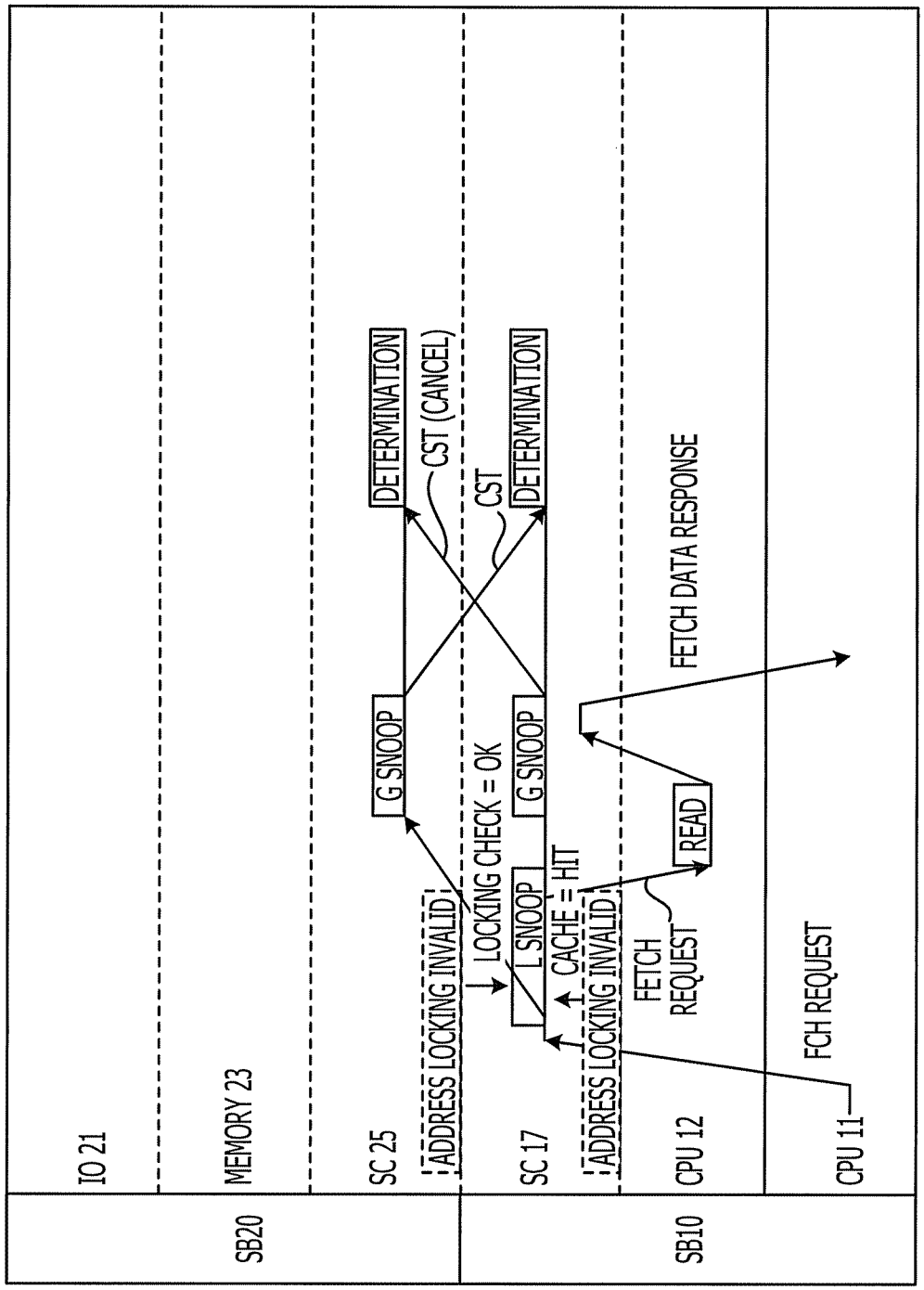
FIG. 7 illustrates a diagram explaining a cache hit in a case of a local memory access that is not according to the embodiment.

FIG. 7 illustrates a diagram explaining a cache hit case in accessing a local memory in the comparative example. In an information processing system 1, when a CPU 11 provided on a system board 10 issues a fetch request (indicated as "FCH" in the drawings) to a system controller 17, the system controller 17 performs a local snoop. When a CPU 12 gets a cache hit with the local snoop, the system controller 17 cancels a global snoop, performs read processing on the CPU 12, and returns a fetch data response to the CPU 11.

Figure 8:
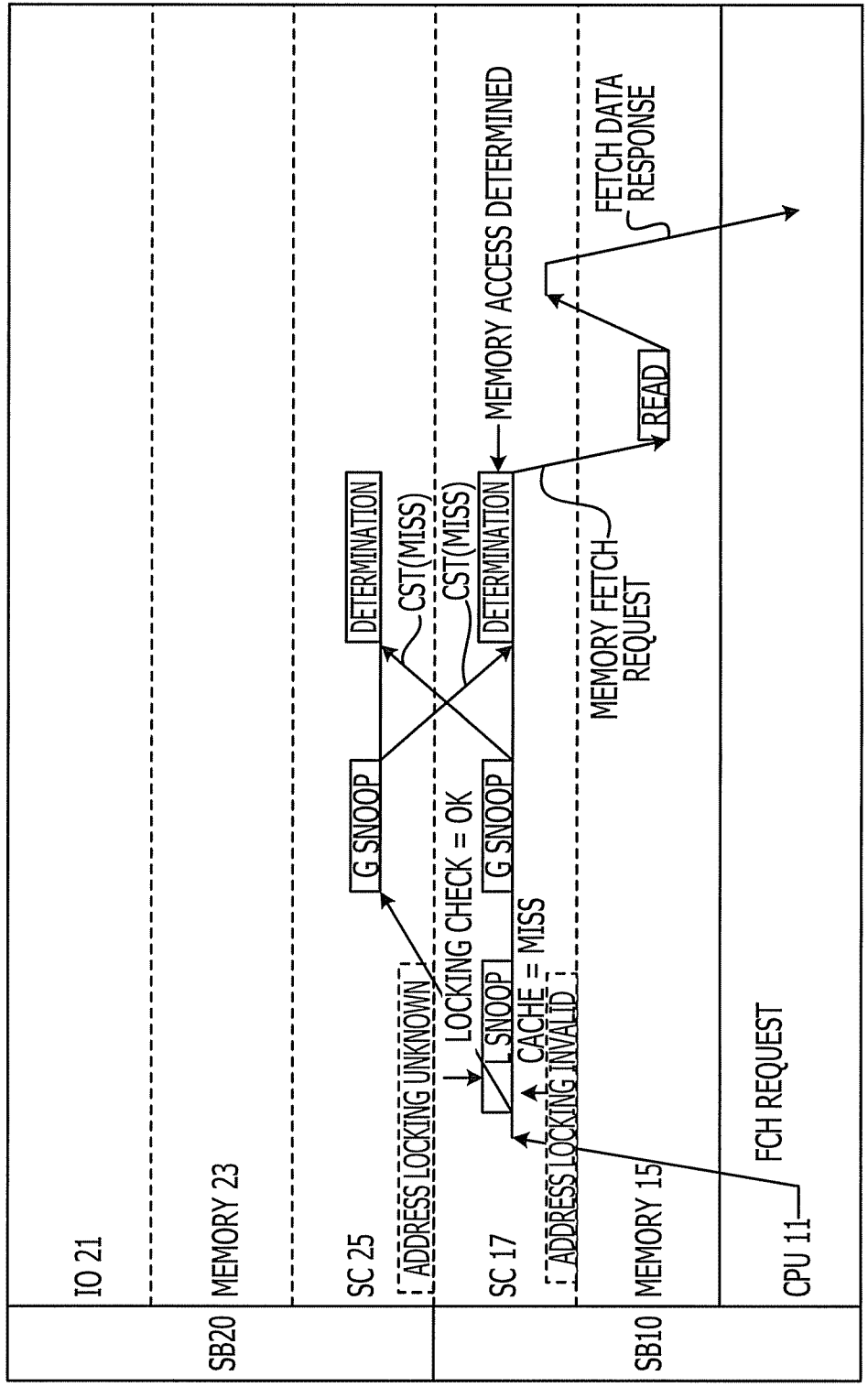
FIG. 8 illustrates a diagram explaining a cache miss in the case of the local memory access that is not according to the embodiment.

FIG. 8 illustrates a diagram explaining a cache miss case in accessing the local memory in the comparative example. In the information processing system 1, when the CPU 11 provided on the system board 10 issues the fetch request (FCH) to the system controller 17, the system controller 17 performs the local snoop. When it is determined by the local snoop that data that is to be fetched is being cached neither by the CPU 11 nor the CPU 12, this means that the state of address locking at the system board 20 is not recognized by the system controller 17 that is a destination of the access request, in the operations illustrated in FIG. 8. In other words, since the state of address locking at the system board 20 is unknown, the fetch request is not resolved with the local snoop.

Next, the global snoop is performed by the system controller 17 and the system controller 25. Each of the system controllers 17 and 25 checks to see if the destination of the fetch request is being locked or not by the global snoop and sends a check result CST with each other.

Each of the system controllers 17 and 25 makes a determination of the state of locking at the destination of the fetch request, by using own check result performed and the other check result received from the other system controller. When the both check results, that is, the check result performed by one of the system controllers and the other check result received from the other system controller are the "lock OK", in other words, when the destination address of the fetch request has not been registered on an address lock control unit (note that it indicates that the destination address is not being locked), the system controllers 17 and 25 make the determination that the fetch request is executable.

Then, the system controller 17 on the system board 10 that is an issuing source of the fetch request performs read processing on the memory 15 that is a local memory and returns a fetch data response to the CPU 11.

In this way, as to the processing operations of the comparative example, access processing may be performed within the local, in the cache hit case. However, processing with the global snoop is carried out in the cache miss case. On the other hand, according to the system controller disclosed in the present embodiment, processing within the local is possible even in the cache miss case with a local memory access, in addition to the cache hit case in which processing within the local is possible.

Figure 9:
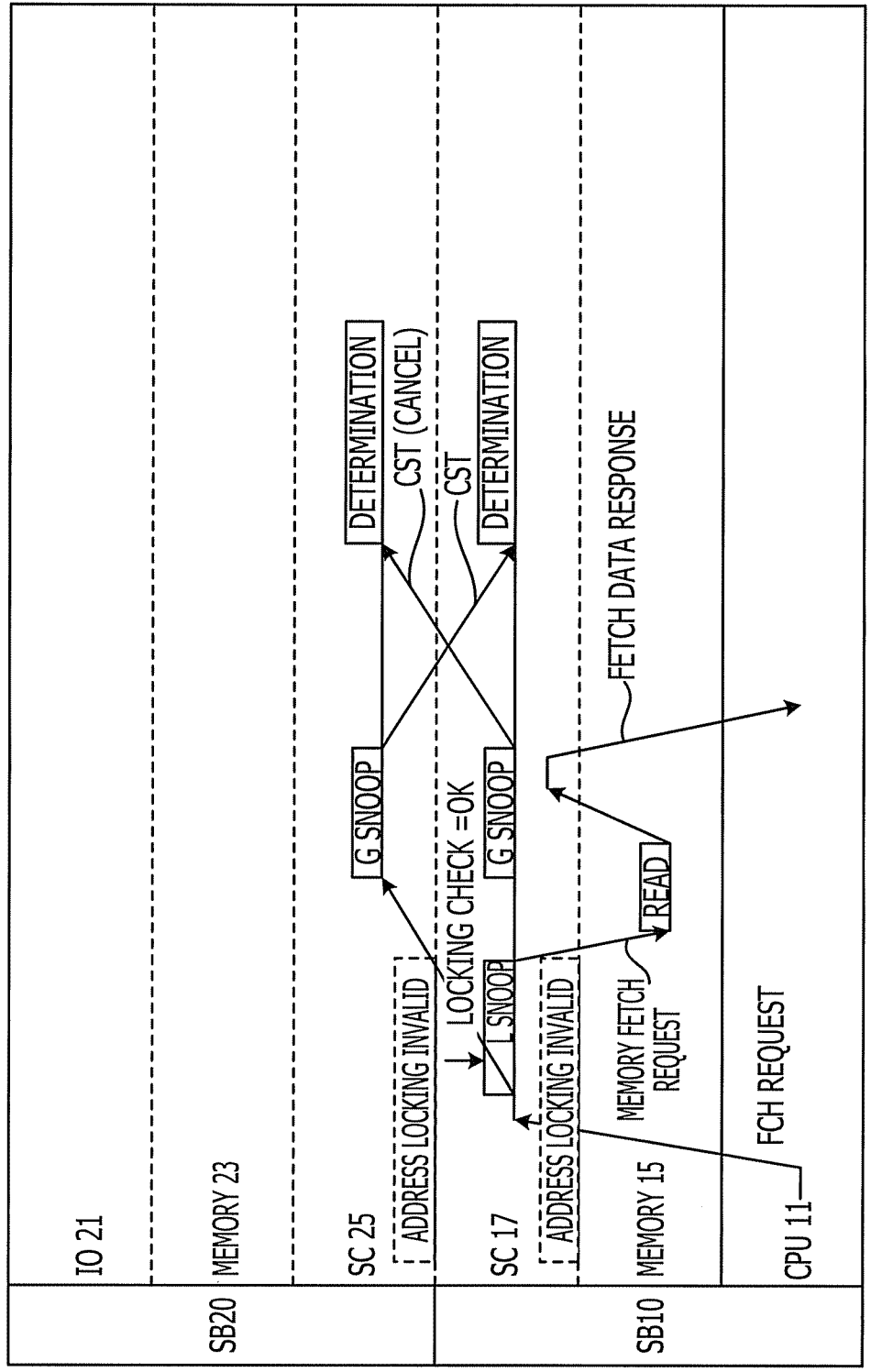
FIG. 9 illustrates a diagram explaining local processing in a cache miss case according to the embodiment.

FIG. 9 illustrates a diagram explaining local processing in the cache miss case according to the present embodiment. In the example illustrated in FIG. 9, when the CPU 11 provided on the system board 10 issues a fetch request (FCH) to the system controller 17, the system controller 17 performs the local snoop. According to the present embodiment, even if data is not cached by the CPU 11 or the CPU 12 with this local snoop, the state of address locking is capable of being checked provided that the access is made to the local memory, since the system controller 17 that is the destination of the access request recognizes the state of address locking.

For this reason, the system controller 17 performs read processing on the memory 15 without checking the system controller 25 and returns the fetch data response to the CPU 11 provided that the system controller 17 confirms with used of the local snoop that the locking check is "OK" and the destination address has not been locked.

In the comparative example illustrated in FIG. 8, even in a case where the CPU 11 coupled to the system board 10 makes the access request to the memory 15 coupled to the system board 10, when the local snoop results in the cache miss, access processing is made after waiting for a result of the global snoop.

In the operations of the present embodiment illustrated in FIG. 9, on the other hand, since the system controller 17 knows the state of address locking of the memory 15 that is the local memory, a result of the locking check is capable of being obtained with the local snoop. For this reason, the access to the memory 15 may be initiated without performing the global snoop, so that a processing time may be reduced. More specifically, the access is capable of being processed in a processing time substantially equal to that of the cache hit case according to the comparative example in FIG. 7, in the cache miss case according to the present embodiment illustrated in FIG. 9.

Figure 10:
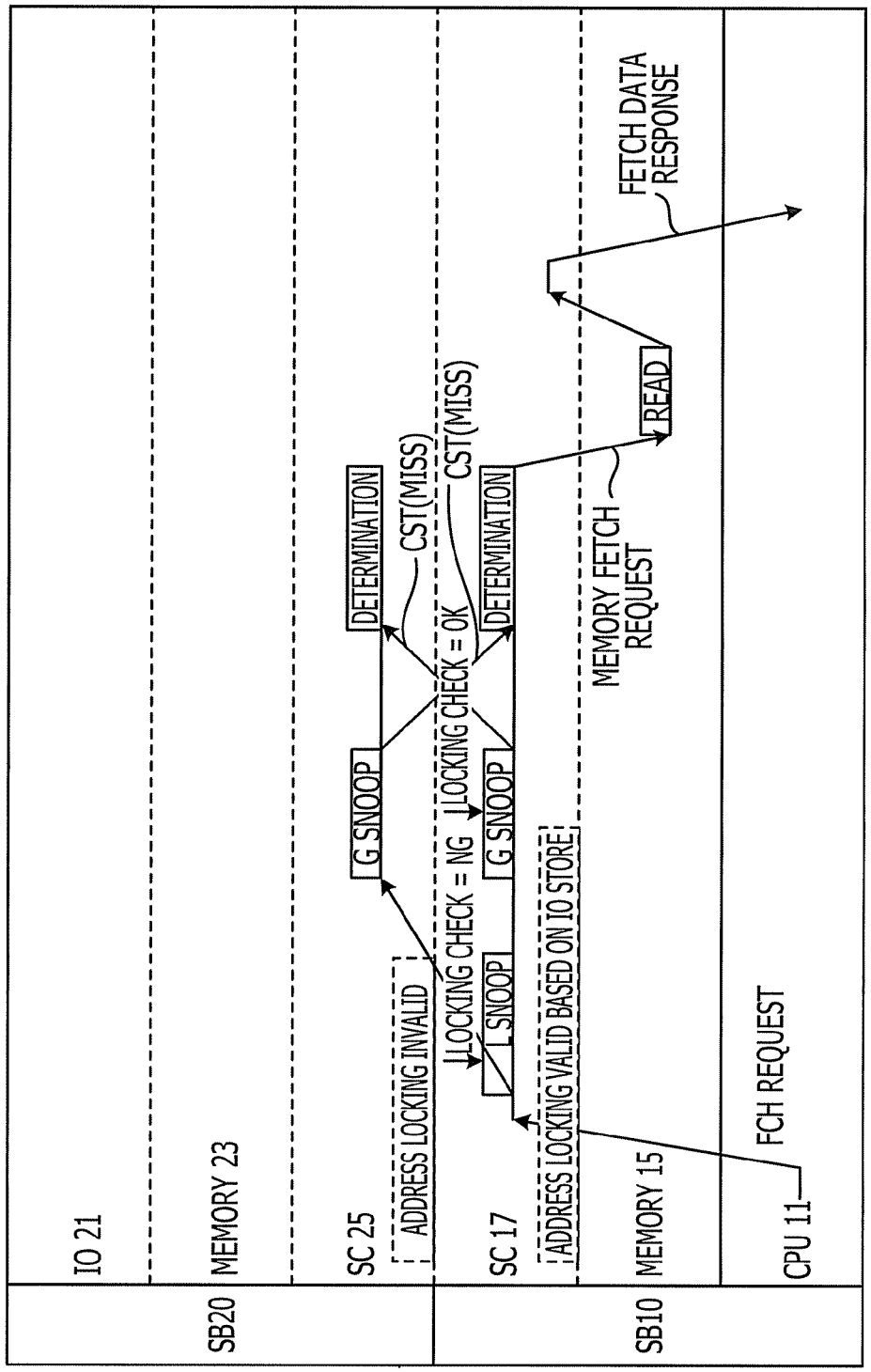
FIG. 10 illustrates a diagram explaining a conflict of accesses to the local memory according to the embodiment.

FIG. 10 illustrates a diagram explaining a conflict of the local memory accesses according to the embodiment. An example in FIG. 10 illustrates a case where a conflict between the fetch request by the CPU 11 and a store request from any of the IOs occurs. When the CPU 11 provided on the system board 10 issues the fetch request (FCH) to the system controller 17, the system controller 17 performs the local snoop, in the example illustrated in FIG. 10. In the present embodiment, the system controller 17 recognizes that the state of address locking of the local memory. In consequence, the system controller 17 is capable of determining based on a result of the local snoop that the locking check results in "NG" because a destination address of the fetch request is being locked according to the store request from the IO. For this reason, the system controller 17 does not process the access to the local memory with the local snoop.

Thereafter, if it is determined that an IO store has completed in timing with the execution of the global snoop, the state of address locking having been set to the system controller 17 is unlocked. Therefore, the result of the locking check is "OK" during the execution of the global snoop, and each of the system controllers 17 and 25 makes a determination that the fetch request from the CPU 11 is executable.

Then, the system controller 17 on the system board 10 that is the issuing source of the fetch request performs the read processing on the memory 15 and returns the fetch data response to the CPU 11.

In this way, the system controller 17 according to the present embodiment may increase the cases capable of being processed with the local snoop in comparison with that in the comparative example. FIG. 11 is a table explaining that the cases capable of being resolved within the local may be increased.

As illustrated in FIG. 11, in a case where a request is a shared-type-fetch, such case may be resolved with the local snoop provided that the cache hit has occurred within the local, in the comparative example. However, the only use of the local snoop does not resolve the cache miss case. In addition, in a case where the request is an exclusive-type-fetch, such request may be resolved with the local snoop only provided that an exclusive cache exists. However, the only use of the local snoop does not resolve the case where the cache miss case and a shared-type-cache coexist.

Regardless of whether the request is the shared-type-fetch or the exclusive-type-fetch, the cache miss case resulted from the access to the local memory is capable of being resolved only with the local snoop, in addition to the case capable of being resolved with the local snoop, according to the method used in the present embodiment. Moreover, a case in which the request is the exclusive-type-fetch and a shared-type-cache hit occurs is capable of being resolved with the local snoop.

Consequently, according to the method disclosed in the present embodiment, resolution with the local snoop is possible except for a cache miss case resulted from an access to a remote memory (that is to say, the access to the memory unit coupled to the other system board).

The information processing system 1 illustrated in FIG. 2 includes one system board 10 provided with the access source unit having the cache therein, and one system board 20 that is not provided with the access source unit having the cache therein. As another example illustrated in FIG. 12, it is also possible to increase the number of system boards that are not provided with the access source unit having the cache. In an information processing system 2 illustrated in FIG. 12, system boards 20_1 through 20_3 each having the same or similar configuration to that of the system board 20 and the system board 10 provided with the access source unit thereon are coupled with each other. In such configuration, a broadcast output unit provided on each of the system boards transfers an access request to all the system boards coupled thereto and a broadcast receiving unit 35 receives the access requests from all the system boards. A global snoop control unit provided on each of the system boards sends a search result of an address lock, to all the system boards coupled thereto. Upon receipt of the search results from all the system boards, the global snoop control unit makes a determination that the access request is unexecutable when any of the search results indicates that the destination address of the access request is under address locked state.

Figure 12:
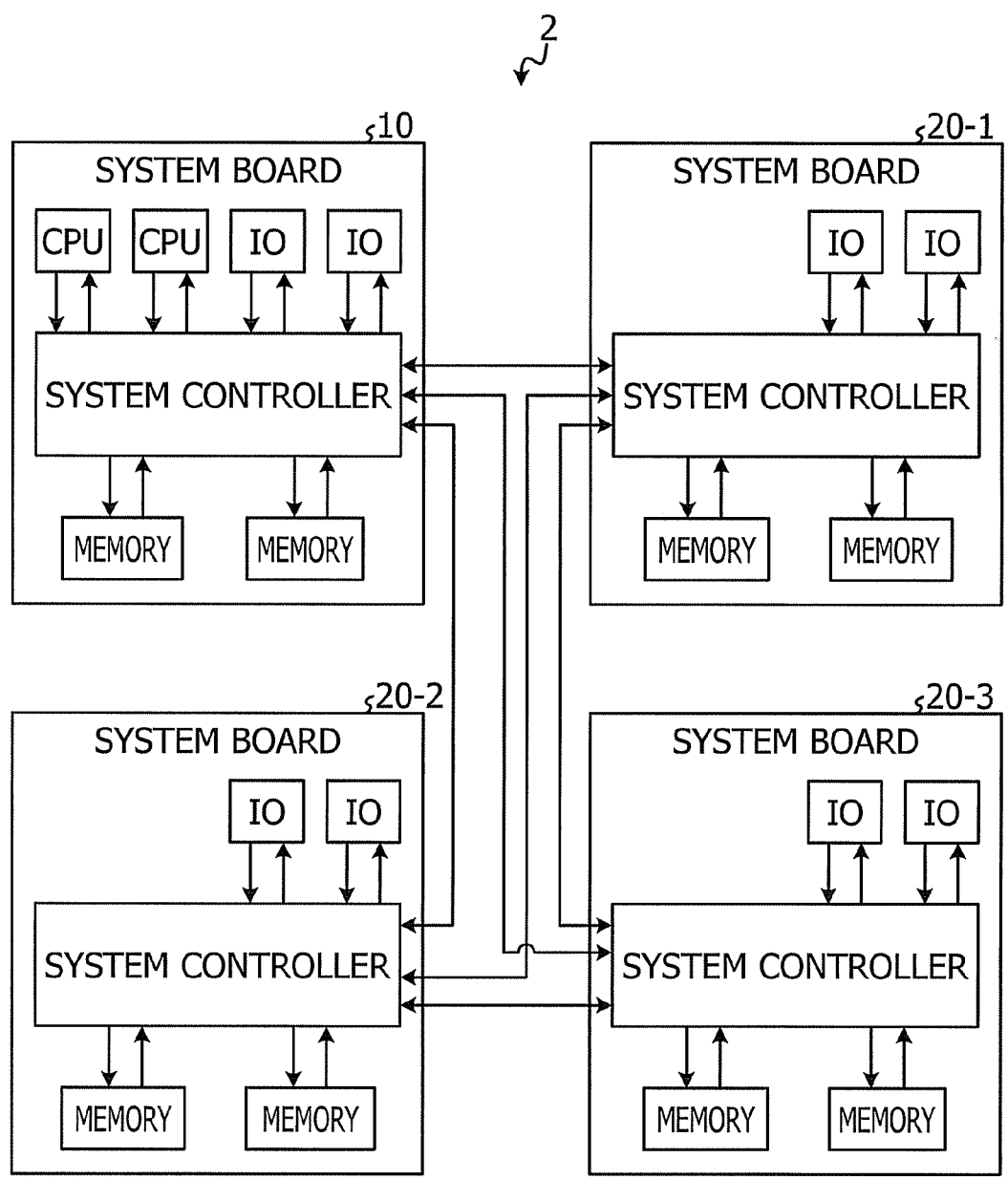
FIG. 12 illustrates a block diagram explaining a modified example of the information processing system.

The number of memories in the system boards 20_1 through 20_3 is the same as that of IOs in the configuration illustrated in FIG. 12. Note however that, if the access source unit that includes the cache therein is not provided, any number of memories and IOs may be possible and it may not be necessary to provide the memory and the IO.

That is to say, such configuration may be, as appropriate, modified to the other configurations provided that the access source unit having the cache therein is provided on one board. In addition, when an information processing system in which an access source unit having a cache is provided on any of the system boards is employed, control with the local snoop in the system boards, each of which is not provided with the access source unit that includes the cache, is unnecessary. It is because that since such a system board is not provided with the access source unit that includes the cache therein, the global snoop is necessary because no cache hit occurs on such board and there is a possibility that the data is cached by the other board.

According to the present embodiment as disclosed above, the address locking for the store access to the memory is set by using the system controller in the system board that includes the target memory thereon and the memory request is executed without referencing a mechanism which transfers a lock register number thereof to the system controller in the system board that includes the request source unit and without referencing the result of the snoop by the other system controller, in the information processing system made up of the plurality of system boards.

According to the method, when the fetch access from the CPU is intended for the memory on the same system board, the store access to the same address is checkable by the system controller. This makes it unnecessary to wait for the completion of the snoop processing by each system controller provided on respective system boards, so that a fetch access time may be reduced. In other words, success cases of the local snoop are added, so that high-speed memory access may be achieved.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Although a few preferred embodiments of the present invention have been shown and described, it would be appreciated by those skilled in the art that changes may be made in these embodiments without departing from the principles and spirit of the invention, the scope of which is defined in the claims and their equivalents.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A system controller, comprising:
an output unit that transfers an access request to a memory unit received from an access source unit coupled to the system controller to another system controller;
a local snoop control unit that first determines whether data about a destination of the access request is being cached in response to the access request from the access source unit coupled to the system controller and then determines whether a destination of the received access request from the access source unit coupled to the system controller is a local memory unit coupled to the system controller when the data about the destination is not being cached, and selectively locks the destination when the data about the destination is being cached and when the destination is the local memory unit;
a receiving unit that receives the access request output by the output unit and an access request output by another system controller;
a global snoop control unit that sends a response indicating whether an access request received by the receiving unit is executable or not, and controls locking of the destination of the access request received by the receiving unit when the destination of the access request received by the receiving unit is the local memory unit; and
an access processing unit that unlocks the locking and accesses the memory unit when the access request from the access source unit coupled to the system controller becomes executable.

2. The system controller according to claim 1, wherein
the global snoop control unit relates the access request to locking identification information, and sends information indicating that the access request is executable and the locking identification information related to the access request, as the response, when the destination of the access request to the local memory unit is being unlocked, and
the access processing unit specifies the locking identification information and executes access processing.

3. The system controller according to claim 2, wherein
the global snoop control unit receives the response from a global snoop control unit in the other system controller and determines whether the access request is executable, and locks the destination as a result of the determination, as the control over the locking, when the access request is executable and the destination of the access request is the local memory unit.

4. The system controller according to claim 1, wherein the global snoop control unit receives the response from a global snoop control unit in the other system controller and determines whether the access request is executable, and locks the destination as a result of the determination, as the control over the locking, when the access request is executable and the destination of the access request is the local memory unit.

5. An information processing system, comprising:

a plurality of system controllers each coupled to at least one memory unit and an access source unit accessing the memory unit, the access source unit being configured to access any memory unit through communication between the plurality of system controllers, wherein at least any one of the plurality of system controllers comprises:

an output unit that transfers an access request in response to the access request to the memory unit from the access source unit coupled to the system controller;

a local snoop control unit that first determines whether data about a destination of the access request is being cached in response to the access request from the access source unit coupled to the system controller and then determines whether a destination of the access request is a local memory unit coupled to the system controller when the access source unit coupled to the system controller made an access request to the memory unit and when the data about the destination is not being cached, and selectively locks the destination when the data about the destination is being cached and when the destination is the local memory unit;

a receiving unit that receives the access request output by the output unit of the system controller and an access request output by another system controller;

a global snoop control unit that sends a response indicating whether the access request received by the receiving unit is executable, and controls locking of the destination when the destination of the access request received by the receiving unit is a local memory unit coupled to the system controller; and an access processing unit that performs an access to the memory unit, and unlocks the locking when the access request from the access source unit coupled to the system controller becomes executable.

6. The information processing system according to claim 5, wherein an access source unit that includes a cache function among the access source units is coupled to a single system controller.

7. The information processing system according to claim 5, wherein the access source unit is a processor including a cache memory.

8. An access processing method of an information processing system that includes a plurality of system controllers each coupled to at least one of a memory unit and an access source unit accessing the memory unit, the access source unit being configured to access any memory unit through communication between the plurality of system controllers, the method comprising:

transferring an access request for accessing any of the memory units received from a local access source unit coupled to the system controller to another system controller, by the system controller;

first determining whether data about a destination of the access request is being cached in response to the access request from the access source unit coupled to the system controller and then determining whether a destination of the received access request is a memory unit coupled to the system controller when the data about the destination is not being cached, by each of the system controllers that received the transferred access request;

selectively locking the memory unit that is the destination of the access request, by the system controller in which the destination of the access request is a local memory unit, and when the data about the destination is being cached;

performing the access request by the system controller that received the access request from the local access source unit; and unlocking the memory unit that is a destination of the performed access request, by the system controller in which the destination of the access request is the local memory unit.

* * * * *